(12) United States Patent
Jöhl et al.

(10) Patent No.: US 7,798,565 B2
(45) Date of Patent: Sep. 21, 2010

(54) ROOF MODULE FOR A VEHICLE AND METHOD FOR MOUNTING A ROOF MODULE OF THIS TYPE

(75) Inventors: Anton Dietmar Jöhl, Bad Heilbrunn (DE); Joachim Klesing, Rochester Hills, MI (US)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/908,639

(22) PCT Filed: Mar. 15, 2006

(86) PCT No.: PCT/DE2006/000469

§ 371 (c)(1), (2), (4) Date: Aug. 13, 2008

(87) PCT Pub. No.: WO2006/097088

PCT Pub. Date: Sep. 21, 2006

(65) Prior Publication Data

US 2008/0303315 A1    Dec. 11, 2008

(30) Foreign Application Priority Data

Mar. 16, 2005    (DE)    ........................ 10 2005 012 122

(51) Int. Cl.
*B62D 25/06*    (2006.01)
(52) U.S. Cl. ................... 296/210; 296/215; 296/216.01
(58) Field of Classification Search ................ 296/97.5, 296/217, 208, 216.01, 210, 214, 215; 318/467
See application file for complete search history.

(56) References Cited

U.S. PATENT DOCUMENTS 4,934,752 A * 6/1990 Bryant ........................ 296/210
5,825,096 A * 10/1998 Morimoto et al. ............ 307/9.1
6,273,499 B1    8/2001 Guyon
6,633,347 B2 * 10/2003 Kitazawa ..................... 348/837
7,086,693 B1 * 8/2006 Huisman ..................... 296/215
7,460,187 B2 * 12/2008 Schedivy ..................... 348/837
2004/0212223 A1 * 10/2004 Donovan et al. ....... 296/216.01
2006/0214471 A1 * 9/2006 Anderson et al. ...... 296/187.01

(Continued)

FOREIGN PATENT DOCUMENTS

DE    3837171    5/1990

(Continued)

*Primary Examiner*—Glenn Dayoan
*Assistant Examiner*—Pinel E Romain
(74) *Attorney, Agent, or Firm*—Fitch, Even, Tabin & Flannery; John M. Naber

(57)    ABSTRACT

The invention relates to a roof module for a vehicle, which can be mounted from above in an opening in the bodywork and which comprises a rigid outer shell (12), in addition to at least one electric functional unit (16), which is pre-installed on the underside of the outer shell by means of a support unit (14). The electric functional unit (16) can be displaced by means of said support unit (14) between a mounting position, in which the electric functional unit can be introduced into the bodywork opening and a functional position, in which at least part of the electric functional unit can be placed against a limit (22) of the bodywork opening. The invention also relates to a method for mounting a roof module of this type.

22 Claims, 2 Drawing Sheets

U.S. PATENT DOCUMENTS

2007/0024092 A1* 2/2007 Zirbs et al. .................. 296/214
2007/0035161 A1* 2/2007 Huisingh et al. ............ 296/215

FOREIGN PATENT DOCUMENTS

| | | |
|---|---|---|
| DE | 19653431 | 7/1997 |
| DE | 19951659 | 5/2001 |
| DE | 19959809 | 6/2001 |
| DE | 10224970 | 1/2004 |
| DE | 10232920 | 2/2004 |
| DE | 10340853 | 3/2005 |
| EP | 0346154 | 12/1989 |
| EP | 1099617 | 5/2001 |
| WO | WO 2004089731 | 10/2004 |

* cited by examiner

ROOF MODULE FOR A VEHICLE AND METHOD FOR MOUNTING A ROOF MODULE OF THIS TYPE

This application is a 35 U.S.C. §371 National Stage entry of PCT/DE2006/000469, filed Mar. 15, 2006, which claims priority from German Patent Application No.: DE 10 2005 012 122.5, filed Mar. 16, 2005, the contents of which are herein incorporated by reference.

The present invention relates to a roof module with the preamble of claim 1, a method for mounting such a roof module and a vehicle provided with such a roof module.

A roof module of the generic type is known from DE 199 51 659 A1, wherein the outer shell is composed of a rigid roof skin which is packed with foamed material on its inner side, and wherein the packing with foamed material is provided with depressions in which electric functional parts such as loudspeakers or switches can be inserted in a housingless fashion and held therein by latching.

U.S. Pat. No. 6,273,499 B1 describes a motor vehicle roof in which electric functional elements are integrated into the inner roof lining of the vehicle and are mounted together with the inner roof lining on the roof surface. Similar vehicle roofs are described, for example, in DE 38 37 171 A1, DE 196 53 431 C1 and EP 0 346 154 A2.

In the relatively old German patent application with the file number 103 40 853, a vehicle roof is described in which an electric functional unit is securely mounted on the underside of the roof surface or on a frame for an opening in the roof, wherein the inner roof lining is free of electric functional units and the electric functional unit is at least partially covered with respect to the passenger compartment of the vehicle.

The object of the present invention is to provide a roof module which is suitable for mounting from above in an opening in the bodywork ("top load" mounting), wherein the intention is to make it possible to mount an electric functional unit in the roof area in a way which is as simple and nevertheless stable and positionally accurate as possible. In addition, the intention is to make available a corresponding mounting method and a vehicle which is provided with such a roof module.

This object is achieved according to the invention by means of a roof module as per claim 1, a mounting method as per claim 19.

In the solution according to the invention it is advantageous that as a result of the fact that the electric functional unit can be adjusted by means of the support unit between a mounted position in which the electric functional unit can be fed through the opening in the bodywork and a functional position in which the electric functional unit can be placed at least partially against a boundary of the opening in the bodywork, it is both possible to pre-install the electric functional unit on the roof module even before the roof module is mounted on the vehicle, as a result of which complex mounting steps such as overhead work can be avoided, and also, despite the top load mounting of the roof module, to place the electric functional unit against a boundary of the opening in the bodywork in order to achieve a stable functional position in which the boundary of the opening in the bodywork can absorb the forces acting on the electric functional unit during operation. In this context, the functional unit can be placed at the functionally favorable position, in particular even if said position is at or below the boundary of the opening in the bodywork. As a result of the pre-installation of the functional unit on the roof module, it is possible to eliminate electrical interfaces in the cabling of the roof, and after installation in the opening in the bodywork only the connections to the on-board electrical system have to be made.

Preferred refinements of the invention can be found in the subclaims.

The invention will be explained in more detail below by way of example with reference to the appended drawings, in which.

Figure 1:
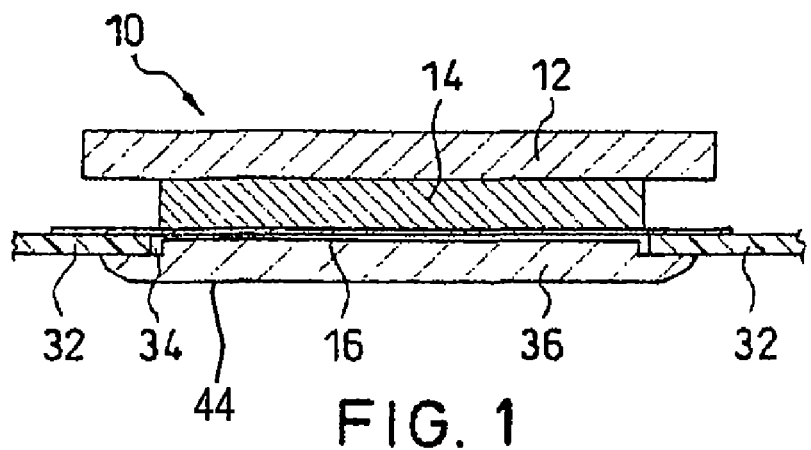
FIG. 1 is a cross-sectional view of the part of a roof module, provided with an electronic functional unit, according to a first embodiment of the invention in the mounted state.

FIG. 1 shows a roof module 10 which has a fixed outer shell 12 which can be securely mounted by its circumferential edges from above in an opening in the bodywork of a vehicle, preferably motor vehicle, in order to form the roof of the vehicle. The opening in the bodywork is bounded here by the roof beams, i.e. the front and rear roof transverse beams and the two longitudinal beams, while the edges of the outer shell 12 are laid on these beams and securely connected thereto, for example by means of a bead of adhesive or a screwed connection. The hard outer shell 12 can comprise, for example on its outer side, a hard roof skin made of plastic, aluminum or steel, which has a support structure, for example a honeycomb structure made of paper, metal or plastic, applied to it by back compression molding, and is stabilized, for example, by means of polyurethane. However, the support structure can also be formed by long fiber injection (LFI) made of polyurethane.

A support unit 14 by means of which an electric functional unit 16 is connected to the outer shell 12 is provided on the underside of the hard outer shall 12. The support unit 14 is embodied in such a way that the electric functional unit 16 can be adjusted by means of the support unit between a mounted position in which the electric functional unit 16 can be fed through the opening in the bodywork or its boundary and a functional position in which the electric functional unit 16 can be placed at least partially against a boundary of the opening in the bodywork. Basically, the support unit 14 can be embodied in such a way that the electric functional unit 16 can be displaced (e.g., adjusted or moved) or pivoted between the mounted position and a functional position. The functional unit 16 can expediently be displaced in the case of a displacement in the plane of the roof, preferably in the longitudinal direction of the roof, while in the case of a pivoting movement the pivoting axis expediently lies either in the plane of the roof, and in this context preferably extends in the transverse direction of the roof or is perpendicular with respect to the plane of the roof.

The displacement movement can be implemented, for example, by means of guide rails, while the pivoting movement can be achieved by means of a hinge or joint. In all cases, the support unit 14 preferably has two adjustable parts which correspond to one another.

Figure 5:
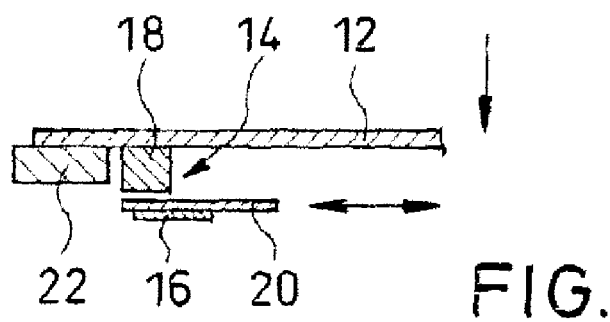
FIG. 5 shows a longitudinal sectional view of the part, provided with an electric functional unit, of a roof module according to the invention during mounting in the vicinity of the front roof transverse beam, wherein the electric functional unit is shown in its mounted position.
Figure 6:
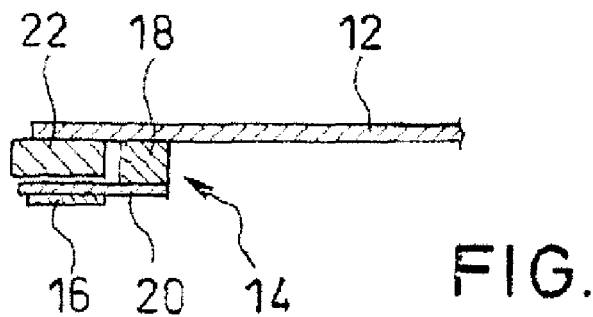
FIG. 6 shows the electric functional unit in its functional position in a view as per FIG. 5.

The principle according to the invention is illustrated by way of example in FIG. 5 and FIG. 6, with the support unit 14 being designed to carry out a displacement movement in the longitudinal direction of the roof. In this context, the support unit 14 comprises an upper part 18 which is securely mounted on the underside of the outer shell 12, and a lower part 20 which is displaceably mounted on the upper part 18 in the longitudinal direction of the roof, and on its underside supports the electric functional unit 16. FIG. 1 shows the support unit 14 in the mounted position of the functional unit 16 in which the lower part 20 of the support unit 14 is displaced downward in the longitudinal direction of the roof (i.e. to the right in FIG. 5), and is secured in this position in order to permit the lower part 20 and therefore the functional unit 16 to pass through the roof opening in the bodywork or the roof beams if the outer shell 12 is placed on the roof beams from above (see arrow in FIG. 5), with only the front roof transverse beam 22 being shown in FIG. 5. The functional unit 16 is already pre-installed in this case and pre-tested by means of the support unit 14 before the roof module 10 is supplied to the car plant, and by virtue of the fact that the roof module 10 is not yet mounted on the vehicle it can be carried out in a comparatively convenient way and with little expenditure, in which case in particular overhead work can be avoided and the functional unit 16 is easily accessible.

In the position shown in FIG. 5, the outer shell 12 is securely connected to the roof beams, for example by bonding or screwing. After the roof module 10 is mounted in this way on the bodywork of the vehicle, the functional unit 16 is moved forward (i.e. to the left in FIG. 5) into the functional position in which the functional unit comes to rest below the transverse beam 22 by displacing the lower part 20 of the support unit 14 in the longitudinal direction of the roof. This position may be favorable for permitting forces occurring during the operation of the functional unit 16 (for example forces caused by activation of a pushbutton knob by the vehicle occupants) to be absorbed by the transverse beam 22 or for moving the functional unit 16 into the position in the roof area which is most favorable for operation (for example to position a light or an activation element at the functionally most favorable position).

Expediently, the functional unit 16 can be secured in the functional position, and this can be done by virtue of a corresponding configuration of the support unit 14 and/or by means of corresponding securement to the transverse beam 22.

The electric functional unit can have one or more of the following elements: lighting elements, operator control elements, control elements, sensors, sound transducers, display elements and transmitter/receiver elements for wireless communication. In particular, the functional unit 16 can be embodied as an integrated functional unit with a common printed circuit board, in particular an FCP printed circuit board, for all the electrical elements.

Figure 4:
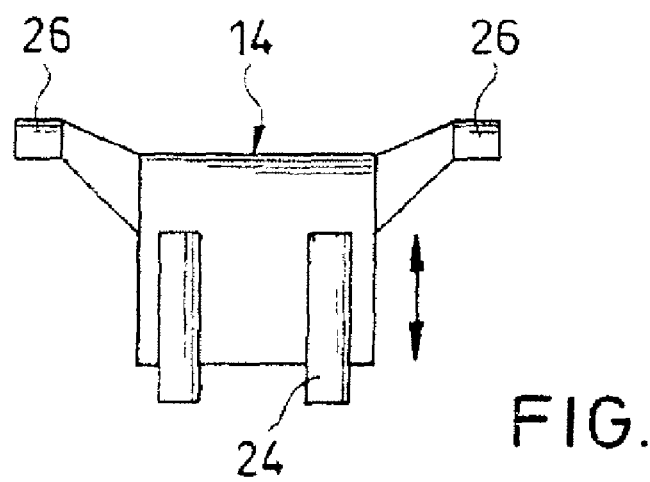
FIG. 4 shows a modified embodiment of the support device in a view as per FIG. 3.

FIG. 4 shows a view from below of a support unit 14 such as can be used in the embodiment in FIG. 5 and FIG. 6, with guide rails 24 being indicated schematically. The lateral projections 26 serve to attach the carrier unit 14 to the outer shell 12.

Figure 3:
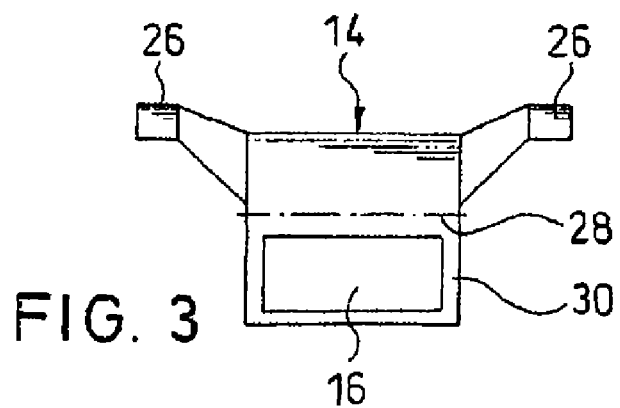
FIG. 3 shows a view of a support device from below for a roof module according to the invention.

FIG. 3 shows a modified embodiment in which the support unit 14 is designed to pivot the functional unit 16 about an axis 28 which runs in the transverse direction of the roof. The pivoting axis 28 can be implemented here, for example, by means of a hinge, while in the mounted position the part 30 of the support unit 14 which supports the functional unit 16 is located in a vertical position in which it is essentially folded downward by means of the hinge 28, and after it has passed through the opening in the bodywork it is pivoted forward into an essentially horizontal position so that in the functional position it is placed from below against the roof transverse beam 22.

After the roof module 10 has been mounted in the opening in the bodywork, a roof inner lining 32 can expediently be mounted from below on the underside of the outer shell 12, which roof inner lining 32 is provided with an opening 34 for at least part of the underside of the electric functional unit 16. In the embodiment shown in FIG. 1, a panel element 36 can be plugged onto the underside of the functional unit 16 in order to cover the underside of the functional unit 16 and also the edge of the opening 34 from below. If the functional unit 16 has a lighting element, the panel 36 preferably has at least one diffusing screen. If the electric functional unit has at least one operator control element, the panel element 36 preferably has at least one activation element 44 for this operator control element. Said operator control elements may be, for example, activation knobs, activation levers, activation panels or the like.

Figure 2:
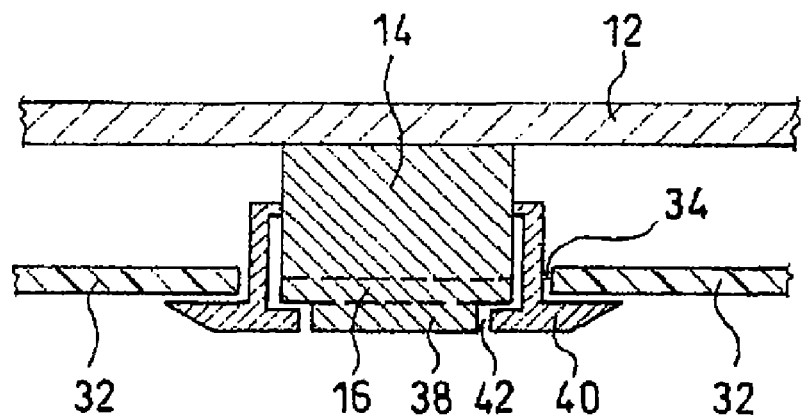
FIG. 2 shows a second embodiment in a view as per FIG. 1.

FIG. 2 shows a modified embodiment in which a panel element is not plugged on but rather the underside of the electric functional unit 16 is formed by an integrated panel element 38. In this context, a frame element 40 is provided which has an opening 42 in order to expose the integrated panel element 38, said frame element 40 covering the edge of the opening 34 in the roof inner lining from below. The frame element 40 is plugged on from below here.

The invention claimed is:

1. A roof module for a vehicle, which can be installed from above a roof opening and which comprises a hard outer shell and at least one electric functional unit which is pre-installed on the underside of the outer shell by an adjustable support unit, wherein the electric functional unit can be movable between an installation position having a pre-install dimension within a perimeter of the outer shell in which the electric functional unit is fed through the roof opening and an installed position having a pre-install dimension extending beyond the perimeter of the outer shell in which the electric functional unit can be placed at least partially against a boundary of the opening in a vehicle bodywork.

2. The roof module of claim 1, characterized in that the electric functional unit can be adjusted between the installation position and the installed position by guide rails of the support unit.

3. The roof module of claim 2, characterized in that the electric functional unit can be adjusted between the installation position and the installed position in the plane of the roof.

4. The roof module of claim 3, characterized in that the electric functional unit can be adjusted in the longitudinal direction of the roof.

5. The roof module of claim 1, characterized in that the electric functional unit can be pivoted between the installation position and the installed position by a hinge of the support unit.

6. The roof module of claim 5, characterized in that the electric functional unit can be pivoted between the installation position and the installed position about an axis lying in the plane of the roof.

7. The roof module of claim 6, characterized in that the pivoting axis runs in the transverse direction of the roof.

8. The roof module of claim 5, characterized in that the electric functional unit can be pivoted between the installation position and the installed position about an axis which is perpendicular to the plane of the roof.

9. The roof module of claim 1, characterized in that the boundary of the opening in the bodywork is a front roof transverse beam.

10. The roof module of claim 1, characterized in that the electric functional unit can be secured to the boundary of the opening in the bodywork.

11. The roof module of claim 1, characterized in that the electric functional unit has at least one of the following elements: lighting elements, operator control elements, control elements, sensors, sound transducers, display elements, transmitter/receiver elements for wireless communication.

12. The roof module of claim 1, characterized in that the underside of the electric functional unit can be covered in the installed position by means of a panel element which can be plugged on from below.

13. The roof module of claim 1, characterized in that the underside of the electric functional unit is formed by an integrated panel element.

14. The roof module of claim 12, characterized in that the electric functional unit has at least one lighting element, and the panel element has at least one diffusing screen.

15. The roof module of claim 12, characterized in that the electric functional unit has at least one operator control element, and the panel element has at least one activation element for the operator control element.

16. The roof module of claim 1, characterized in that at least one electrical interface is provided in order to connect the functional unit to the on-board electrical system of the vehicle.

17. A method for mounting a roof module, comprising the steps of:
   pre-installing an electric functional unit on an underside of an outer shell in an installation position by an adjustable support unit,
   mounting the roof module from above in an opening in a vehicle bodywork, wherein the electric functional unit is fed through the roof opening and
   moving the electric functional unit from the installation position having a pre-install dimension within a perimeter of the outer shell into an installed position having an installed dimension extending beyond the perimeter of the outer shell in order to bear against a boundary of the roof opening.

18. The method of claim 17, further comprising the step of in the installed position, installing a panel element from below onto an underside of the electric functional unit in order to cover the underside of the electric functional unit.

19. The method of claim 17, further comprising the step of mounting a roof liner after the roof module has been mounted in the roof opening from below on the underside of the outer shell, said roof inner lining being provided with an opening for at least part of an underside of the electric functional unit.

20. The method of claim 18, characterized in that after the panel element has been plugged onto the underside of the electric functional unit it covers the edge of the opening in the roof inner lining from below.

21. The method of claim 17, characterized in that the underside of the electric functional unit is formed by an integrated panel element, wherein a frame element is plugged onto the underside of the electric functional unit from below, which frame element has an opening in order to expose the panel element and which covers the edge of the opening in a roof inner lining from below.

22. The method of claim 17, characterized in that when the roof module is mounted, it is bonded to the boundary of the roof opening.

* * * * *